United States Patent
Gil et al.

(10) Patent No.: US 8,984,328 B2
(45) Date of Patent: Mar. 17, 2015

(54) FAULT TOLERANCE IN A PARALLEL DATABASE SYSTEM

(75) Inventors: German A. Gil, Irvine, CA (US); Yunsheng He, Irvine, CA (US); Dale S. Grinnell, Oceanside, CA (US); Paul Herman Dyke, Mission Viejo, CA (US); Subhankar Aich, Irvine, CA (US); Ruwen Henning Hess, Long Beach, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 944 days.

(21) Appl. No.: 13/046,414

(22) Filed: Mar. 11, 2011

(65) Prior Publication Data

US 2012/0233496 A1 Sep. 13, 2012

(51) Int. Cl.
*G06F 11/00* (2006.01)
*G06F 11/20* (2006.01)

(52) U.S. Cl.
CPC ........ *G06F 11/2025* (2013.01); *G06F 11/2028* (2013.01); *G06F 11/2038* (2013.01); *G06F 11/2043* (2013.01); *G06F 2201/80* (2013.01)
USPC ........................................ 714/4.11; 714/4.12

(58) Field of Classification Search
USPC .............................................. 714/4.11, 4.12
See application file for complete search history.

(56) References Cited

U.S. PATENT DOCUMENTS

| | | | |
|---|---|---|---|
| 6,854,069 B2 * | 2/2005 | Kampe et al. ................ | 714/4.12 |
| 7,254,640 B2 | 8/2007 | Alexander | |
| 7,353,259 B1 * | 4/2008 | Bakke et al. .................. | 709/208 |
| 7,587,465 B1 * | 9/2009 | Muchow ....................... | 709/209 |
| 7,802,128 B2 * | 9/2010 | Dasari et al. .................... | 714/4.1 |
| 2005/0172161 A1 * | 8/2005 | Cruz et al. ......................... | 714/4 |
| 2006/0053216 A1 * | 3/2006 | Deokar et al. ................. | 709/223 |
| 2006/0277429 A1 * | 12/2006 | Dasari et al. ...................... | 714/4 |
| 2010/0042715 A1 * | 2/2010 | Tham et al. .................... | 709/224 |
| 2011/0231696 A1 * | 9/2011 | Ji et al. .............................. | 714/3 |

OTHER PUBLICATIONS

Oracle® Fail Safe Concepts and Administration Guide Release 3.3.3 for Windows, Dec. 17, 2010 (Retrieved Date), (24 pages).

Brian Mitchell, PDW Architecture: The Data Rack, Jun. 30, 2010, (4 pages).

Matt Peebles, Microsoft SQL Server 2008 R2 Parallel Data Warehouse Deep Dive, Pub. Date 2010, (16 pages).

(Continued)

*Primary Examiner* — Bryce Bonzo
*Assistant Examiner* — Elmira Mehrmanesh
(74) *Attorney, Agent, or Firm* — Kate Drakos; David Andrews; Micky Minas

(57) ABSTRACT

Embodiments are directed to establishing a fault tolerant parallel database system and to detecting the health of parallel database services. In an embodiment, a computer system establishes a control node cluster that includes at least one active control node and at least one spare control node. Each node of the control node cluster includes specific functions assumable only by other control nodes. The computer system also establishes a compute node cluster that includes at least one active computing node, at least one spare computing node, at least one active storage node and at least one spare storage node. Each of the computing and storage nodes includes specific functions assumable only by other computing and storage nodes. The computer system detects a failure of an active node and instantiates a corresponding spare node that is configured to perform the functions of the failed active node.

20 Claims, 4 Drawing Sheets

(56) References Cited

OTHER PUBLICATIONS

Steve Jones, The Parallel Data Warehouse Edition of SQL Server 2008 R2—TechEd 2010, Jun. 8, 2010, (4 pages).
NetWare Cluster Services Overview and Installation, Dec. 17, 2010 (Retrieved Date), (12 pages).
High Availability and Scalability, Dec. 17, 2010 (Retrieved Date), (23 pages).
Greenplum—Driving the Future of Data Warehousing and Analytics, Dec. 17, 2010 (Retrieved Date), (3 pages).

* cited by examiner

FAULT TOLERANCE IN A PARALLEL DATABASE SYSTEM

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to interact with other software applications or other computer systems. For example, client applications may be configured to send data to and receive data from a web server. The web server may be configured to receive requests from end-users, process those requests, and return the result to the end-user. Such web servers are often relied on by end-users to provide data and services twenty-four hours a day, seven days a week. As such, these web servers may implement some form of fault tolerance. This fault tolerance may allow a second web server to take the place of the first web server if the first web server were to go down. This form of fault tolerance, however, does not work with all types of computing systems.

BRIEF SUMMARY

Embodiments described herein are directed to establishing a fault tolerant parallel database system and to detecting the health of parallel database services. In one embodiment, a computer system establishes a control node cluster that includes at least one active control node and at least one spare control node. Each node of the control node cluster includes specific functions assumable only by other control nodes. The computer system also establishes a compute node cluster that includes at least one active computing node, at least one spare computing node, at least one active storage node and at least one spare storage node. Each of the computing and storage nodes includes specific functions assumable only by other computing and storage nodes. The computer system detects a failure of an active node and instantiates a corresponding spare node that is configured to perform the functions of the failed active node.

In another embodiment, a computer system sends an inquiry to various embedded health detectors embedded in a specified parallel database service to determine the health of the parallel database service. The computer system of receives from the embedded health detectors a service status indication for the specified service. Based on the service status indication, the computer determines that the service is to be either restarted or terminated. Based on this determination, the computer system sends either a restart or a terminate command to the specified service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
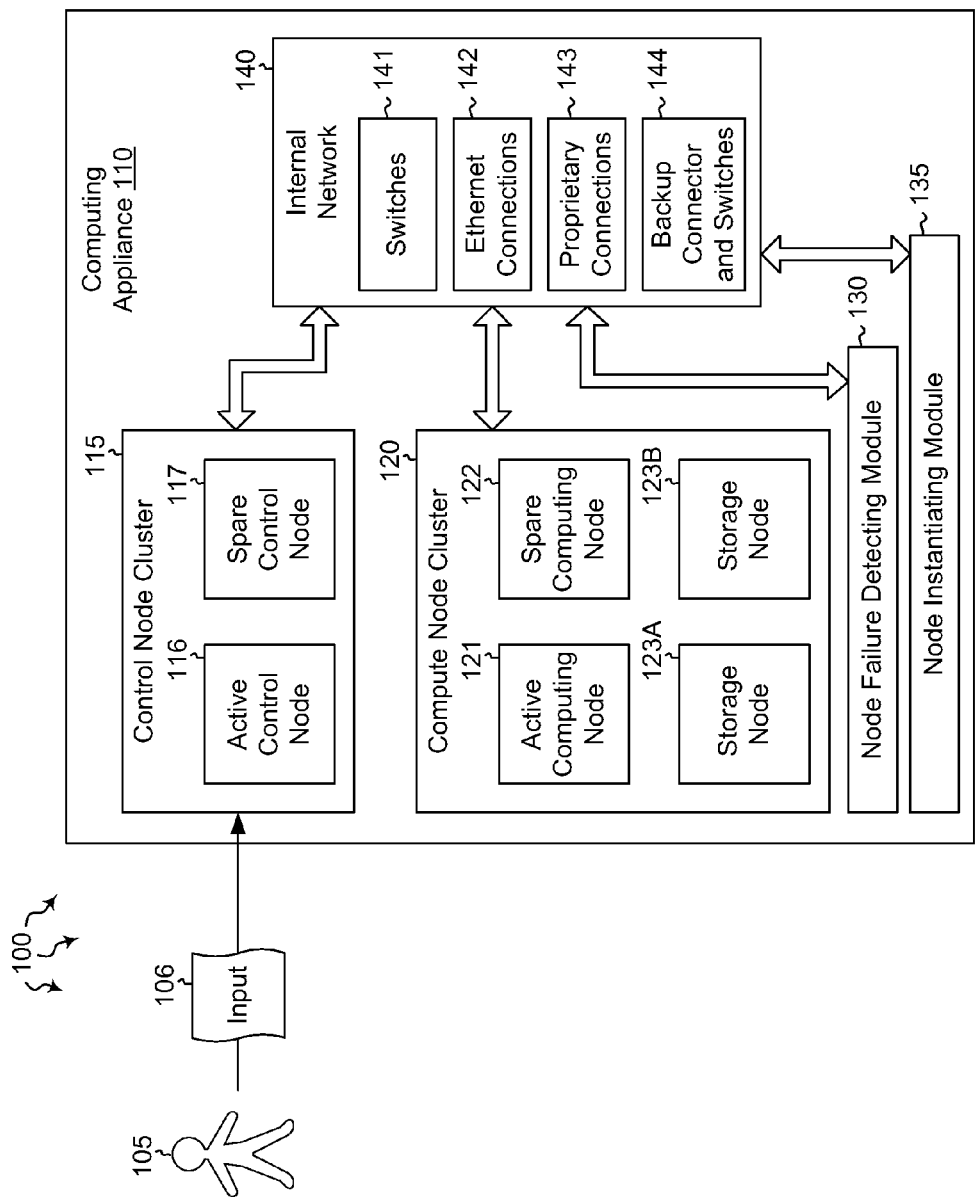
FIG. 1 illustrates a computer architecture in which embodiments of the present invention may operate including establishing a fault tolerant parallel database system and detecting the health of parallel database services.

Embodiments described herein are directed to establishing a fault tolerant parallel database system and to detecting the health of parallel database services. In one embodiment, a computer system establishes a control node cluster that includes at least one active control node and at least one spare control node. Each node of the control node cluster includes specific functions assumable only by other control nodes. The computer system also establishes a compute node cluster that includes at least one active computing node, at least one spare computing node, at least one active storage node and at least one spare storage node. Each of the computing and storage nodes includes specific functions assumable only by other computing and storage nodes. The computer system detects a failure of an active node and instantiates a corresponding spare node that is configured to perform the functions of the failed active node.

In another embodiment, a computer system sends an inquiry to various embedded health detectors embedded in a specified parallel database service to determine the health of the parallel database service. The computer system of receives from the embedded health detectors a service status indication for the specified service. Based on the service status indication, the computer determines that the service is to be either restarted or terminated. Based on this determination, the computer system sends either a restart or a terminate command to the specified service.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which various embodiments may be employed. Computer architecture 100 includes computing appliance 110. Computing appliance 110 may be any type of local or distributed, fixed or mobile computing system. In some embodiments, the computing appliance includes hardware, pre-installed software, and internal network components for internal communication. The appliance may be configured to provide a given service. For instance, the appliance may be configured to provide database service, and, at least in some cases, may comprise a parallel database.

The appliance may include multiple different hardware portions including control node cluster 115 and compute node cluster 120. These node clusters may comprise substantially any number of computer servers (i.e. nodes), located within the appliance, or located external to the appliance. The various nodes may be connected by internal network 140. The internal network may include multiple different types of hardware and other connections including switches 141, Ethernet connections 142, proprietary connections (e.g. InfiniBand™ connections) 143 and other types of connections.

Each node may include a backup node, and each network connector may include a backup connector 144. For instance, active control node 116 has a corresponding spare control node 117. In compute node cluster 120, active computing node 121 has a corresponding spare computing node 122, and active storage node 123 has a corresponding spare storage node 124. While FIG. 1 shows a one-to-one relationship between active nodes and spare nodes, many-to-one and one-to-many relationships are also possible. In such cases, multiple active nodes may have a single corresponding spare node, or a single active node may have multiple corresponding spare nodes. It will be understood by one skilled in the art that many different combinations and variations of such can be used. It will be further understood that every powered component may have a backup power source (e.g. an uninterrupted power supply (UPS) or other redundant power supply). Moreover, each network and other component may also have its own backup component.

The computing appliance may be configured to receive input 106 from various users (e.g. user 105). The input may be used to control or otherwise implement various aspects of the appliance. A node failure detecting module 130 may be included which detects when any of the various nodes is beginning to fail or has failed. In response to such a node failure, the node instantiating module 135 may instantiate a spare node to operate in place of the failed node. As shown in FIG. 1, active nodes have corresponding spare nodes. Each spare node is configured to assume the role of a corresponding active node. In some cases, failed active nodes can only be replaced by spare nodes of that type. For instance, an active storage node 123 may only be replaced by a spare storage node 124. As such, each node has spare, corresponding nodes.

In some embodiments, the appliance 110 may be divided physically into different clusters (control node cluster 115 and compute node cluster 120). At least in some cases, the nodes may have the same hardware configuration. Each rack of compute nodes may be setup as its own cluster. Each rack may include one or more corresponding spare nodes. In cases where the appliance is used as a parallel database, each node in the parallel database has a specific role determined by the hashing of the data. Each spare (i.e. passive) node can take over the work of any of the corresponding active nodes of that node type.

As mentioned above, the physical layout of appliance 110 may include redundancy at each level, leaving no single point of failure for network and hardware resources. Each hardware component may have redundancy. For example, servers may have redundant power supplies, RAID (redundant array of inexpensive disks)-configured disk drives, redundant Ethernet ports, redundant InfiniBand™ (IB herein) ports, and redundant fiber channel ports. Storage arrays may include redundant processors, redundant power supplies, redundant fiber channel connections, RAID-configured disk drives, hot spare drives, and redundant Ethernet ports. Switches may include redundant Ethernet switches per data rack, with redundant power supplies, redundant IB switches per data rack, with redundant power supplies, redundant fiber channel switches per data rack and redundant power supplies, a master IB switch with multiple power supplies, and independent switch blades.

In some cases, when implementing proprietary connections such as IB switches, additional DNS (domain name system) configurations are provided to support increased availability. When acting as a parallel database, the appliance 110 may provide custom resource libraries to monitor the various running services. These libraries may be extensible to incorporate multiple kinds of tests or checks. These checks may be used to verify hardware usage, as well as interconnectivity between clusters and other systems.

Policies may be implemented on the computing appliance 110 to monitor the various hardware components. The policies may be designed to restart the services that control the various nodes. If, after repeated attempts, the service is not restarted, the policy will dictate that the service is to be moved to an available spare node. Each cluster may have active nodes and corresponding spare nodes. Spare nodes ensure that a working node is continuously available. In some cases, an abstract representation of the nodes is implemented which does not require knowledge of the physical allocations among the nodes for node switchover to work as expected. Services may include verifiers which probe specific areas of the product to determine how well the service is functioning (e.g. current connectivity, resource use, etc.).

When node or service failures occur, the behavior of appliance 110 may be determined by what failure has occurred and where the failure occurred. In cases where the failure occurs in active control node 116, client connections are dropped. Clients then re-establish connections to the appliance. A shared external virtual IP (internet protocol) address may be assigned to the spare control node 117, obfuscating which of the control nodes is currently handling incoming requests. In cases where the failure occurs in active computing node 121, client queries that are in transit will be cancelled. Incoming queries will be queued while any other services and resources come back online. In cases where the failure occurs in a hardware component, a hardware controller will be restarted and, upon failure to restart, the services provided by that hardware component will be moved to the spare computing node 122.

Continuing, in cases where the failure occurs in database software, the database server will be restarted. The restart may cause parallel database services running on the same node to be restarted and reconnected. In cases where the failure occurs in an appliance system engine, the engine process will be restarted, all connections will be dropped and the customers will be prompted to reconnect. A database management system may attempt to reconnect the disconnected nodes. Any query that was in transit would be cancelled and would need to be re-issued. In cases where the failure occurs in the database management system (DMS), the DMS may detect connection failures and may attempt to bring down the services considered as healthy in a controlled fashion. Upon restart, services are reconnected. Queries that were in transit during the failure will be cancelled. Any queued queries (and/or loads) will remain as queued pending the recovery of the DMS.

The computing appliance may configured to automatically restart services before failing over to a spare node. Policies may define how many restarts will be attempted per resource before declaring that a failover is to occur. DMS services running on each of the nodes may be configured to monitor and detect the lack of incoming connections. If no incoming connections are detected, the DMS services may then kill the service. If this occurs a certain number of times, the policy will indicate that a failover is to occur, and the incoming connections will be routed to the spare node. These and other concepts will be explained below in greater detail with reference to methods 200 and 300 of FIGS. 2 and 3, respectively.

Figure 2:
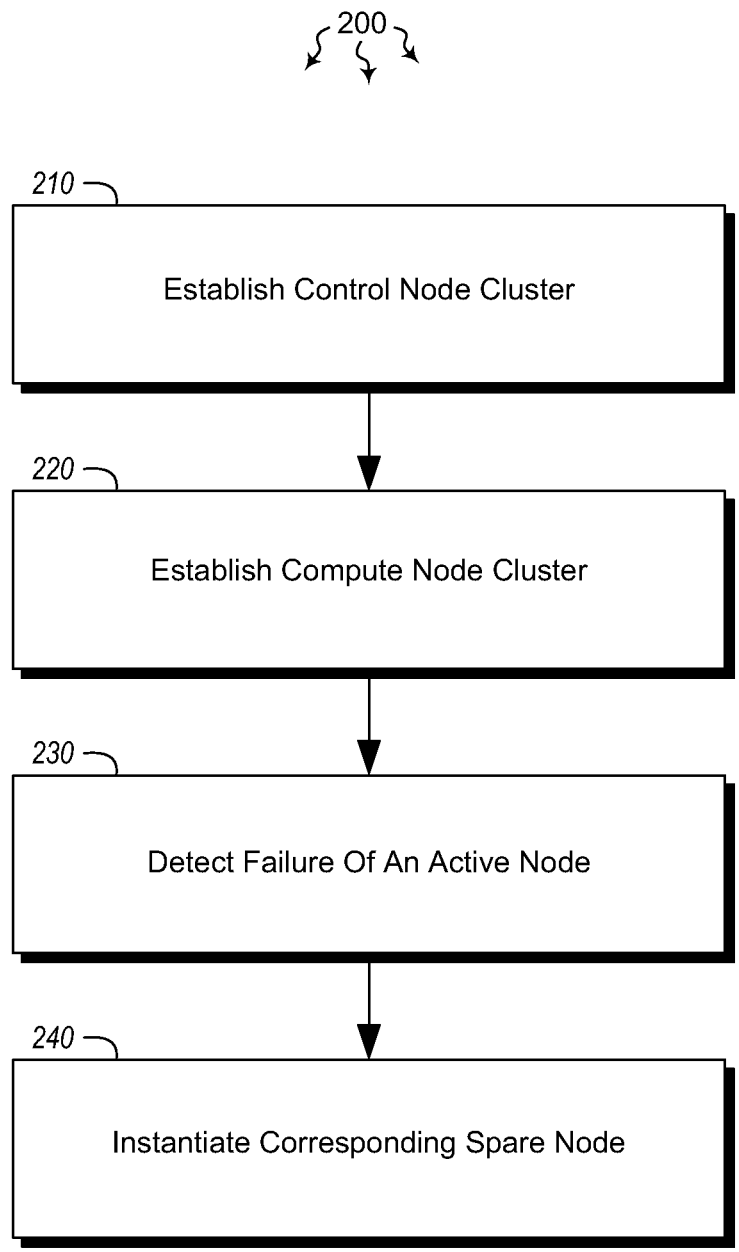
FIG. 2 illustrates a flowchart of an example method for establishing a fault tolerant parallel database system.
Figure 3:
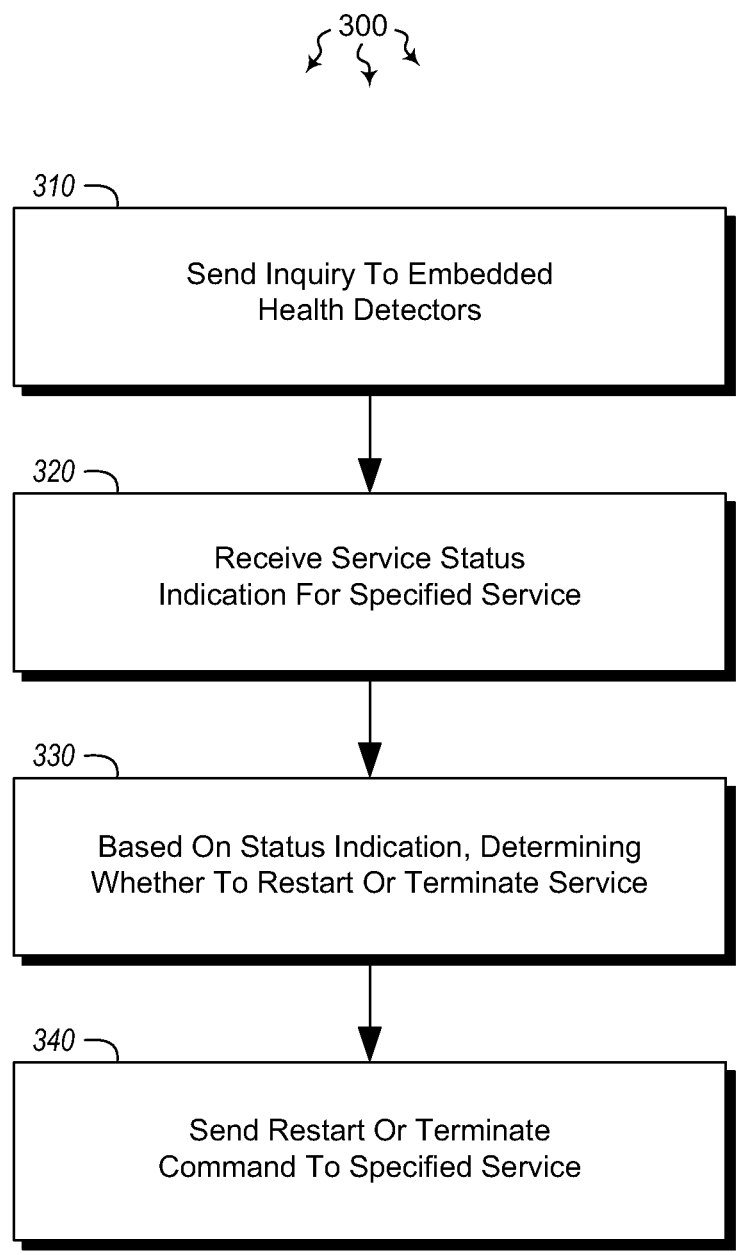
FIG. 3 illustrates a flowchart of an example method for detecting the health of parallel database services.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for establishing a fault tolerant parallel database system. The method 200 will now be described with frequent reference to the components and data of environment 100.

Method 200 includes an act of establishing a control node cluster comprising at least one active control node and at least one spare control node, wherein each node of the control node cluster includes specific functions assumable only by other control nodes (act 210). For example, control node cluster 115 may be established in computing appliance 110. The control node cluster may include active control node 116 and one or more spare control nodes 117. The active control node may include specific functions that are assumable only by spare control nodes. In some cases, a computing appliance user 105 may determine a customizable number of spare nodes for the active control node. Additionally or alternatively, a user may specify that a spare node is to act as a spare for a customizable number of active nodes.

Method 200 includes an act of establishing a compute node cluster comprising at least one active computing node, at least one spare computing node, at least one active storage node and at least one spare storage node, wherein each of the computing and storage nodes includes specific functions assumable only by other computing and storage nodes (act 220). For example, compute node cluster 120 may be established in computing appliance 110. The compute node cluster may include active computing node 121, spare computing node 122, active storage node 123 and spare storage node 124. Active computing and storage nodes may include specific functions that are assumable only by other spare computing and storage nodes, respectively. The control node cluster may be accessible via a control section. In this manner, users may log in to the control node to control the computing appliance.

In some embodiments, the control node and compute node clusters (115 and 120) are located on the same computing appliance 110. The two clusters may be linked via an internal network 140 within the computing appliance. Each node of the computing appliance is linked via an internal network within the computing appliance. The internal network within the computing appliance may include multiple redundant switches 141, each switch with its own redundant power supply. The internal network may also include multiple Ethernet connections 142, proprietary connections 143 and backup connections 144 of various types (including those listed above). Each powered component of the computing appliance may have a corresponding redundant component, and each component may have a redundant power supply.

Method 200 includes an act of detecting a failure of at least one active node (act 230). For example, node failure detecting module 130 may determine that at least one of the active nodes (active control node 116, active computing node 121 and active storage node 123) has failed. The node failure detecting module may make this determination based on receiving too few or no responses from the node, or may determine from health status information that the node is overburdened and has too few processing resources available. Upon detecting failure of a given active node, connections between previously running services may automatically be reestablished once the spare node has been activated.

The currently active control node may determine which services are to be restarted and which are to be terminated. If a service has been terminated a certain specified number of times (this number may be customizable in some cases), the currently active control node may determine that the node running that service is no longer working and that a spare node is to be initialized in its place. Accordingly, by default, a service may be restarted X number of times, and after it has been restarted X number of times, the node running that service is deemed to be unresponsive. If the node is still active and the service is to be restarted, the currently active control node may determine whether to perform a quick service restart which simply restarts the service without attempting to re-establish prior connections, or to perform a service restore which attempts to re-establish connections to those computing systems with which it was connected before the service failed. In such case, restoring the service may include persisting the current state of the service and requesting the nodes with which the service was communicating to resend their data.

Method 200 also includes an act of instantiating a corresponding spare node that is configured to perform the functions of the failed active node (act 240). For example, node instantiating module 135 may instantiate a spare node that corresponds to the (formerly) active, failed node. The corresponding spare node is configured to perform the functions previously provided by the failed node. Policies operating on the computing appliance may define how failures are to be handled for each type of component on the computing appliance.

Figure 4:
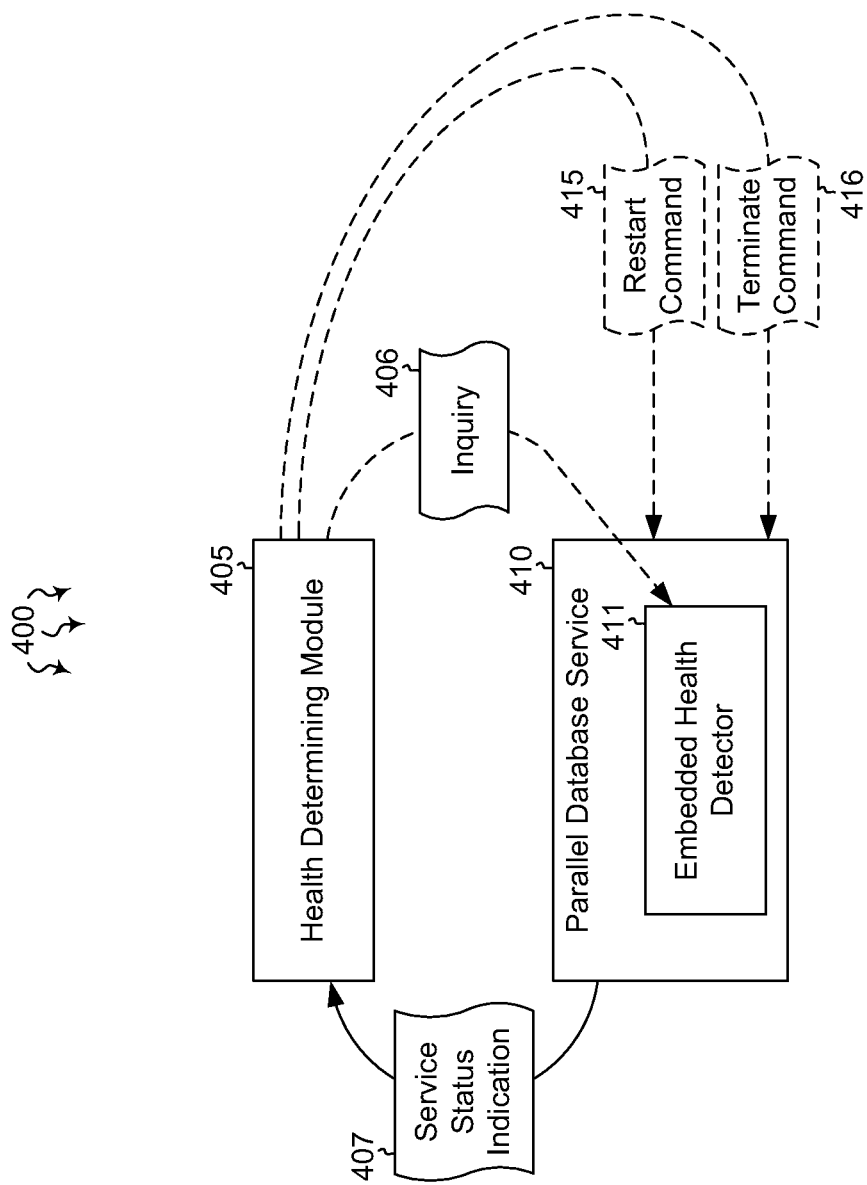
FIG. 4 illustrates an embodiment of the present invention in which parallel database service health detection is performed.

FIG. 3 illustrates a flowchart of a method 300 for detecting the health of parallel database services. The method 300 will now be described with frequent reference to the components and data of environments 100 and 400 of FIGS. 1 and 4, respectively.

Method 300 includes an act of sending an inquiry to one or more embedded health detectors embedded in a specified parallel database service to determine the health of the parallel database service (act 310). For example, health determining module 405 may send inquiry 406 to embedded health detector 411 which is embedded in parallel database service 410. The inquiry may be sent to determine the health of the parallel database service. The parallel database service, as the term is used herein, may refer to a service that works on appliance 110 to write data to and read data from a database, where multiple reads and writes are performed in parallel. The service may be configured to run on one or more active computing nodes 121, while having access to one or more active storage nodes 123 and being controlled by active control node 116. Determining the health of such a parallel database service may include analyzing multiple different factors related to the service's current and past operating conditions.

Method 300 includes an act of receiving from the one or more embedded health detectors a service status indication for the specified service (act 320). For example, health determining module 405 may receive service status indication 407 from embedded health detector 411. The service status indication may indicate current operating conditions at the parallel database service 410. The service status indication may also indicate past operating conditions. A user or administrator may be able to specify the time period for which the service status indication is to include information. Thus, if a user specifies a one hour or one day or one week time period, the embedded health detector may report on how the service has been used over that time period, and what its status was at various predefined intervals.

Method 300 includes, based on the received service status indication, an act of determining that the service is to be at least one of restarted and terminated (act 330). For example, based on received service status indication 407, the health determining module 405 may determine that the service is to be either restarted (and here, whether it is to be a quick restart or a restore) or terminated. If, for example, a service policy is in place which indicates a certain number of times a service is allowed to be restarted before it is terminated, and that number of restarts has been exceeded, the service will be terminated, and a spare node will be initiated. If, the indicated number of times has not yet been reached, then the service will be restarted. In some cases, multiple termination signals may be sent; once a certain number of such signals have been sent, the service will be assumed to be dead, and will be moved to a spare node.

Method 300 includes, based on the determination, an act of sending at least one of a restart and a terminate command to the specified service (act 340). For example, based on the health determining module's determination, the health determining module may send either a restart command 415 or a terminate command 416 to the parallel database service. Thus, if the number of restart times indicated in policy has not been reached, the restart command will be sent, and if the number of restart times indicated in policy has been reached, the terminate command will be sent. In some cases, the service restart is performed immediately (or substantially immediately), without accessing service state information or attempting to reconnect previously connected users (i.e. a quick restart). In other cases, the service restart is performed after attempting to restore previously established connections (i.e. a restore). The determination to perform a quick restart or a restore may be based on policy set by an administrator.

Accordingly, methods, systems and computer program products are provided which establish a fault tolerant parallel database system, with multiple different computing clusters, where each cluster and system component can communicate over an internal network. Moreover, methods, systems and computer program products are provided which detect the health of parallel database services using health detectors embedded within the service.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for establishing a fault tolerant parallel database system, the method comprising:
    an act of establishing a control node cluster comprising at least one active control node and at least one spare control node, wherein each node of the control node cluster includes specific functions assumable only by other control nodes, such that a compute or storage node cannot assume the specific function of the control nodes;
    an act of establishing a compute node cluster separate from the control node cluster comprising at least one active computing node, at least one spare computing node, at least one active storage node and at least one spare storage node, wherein each of the computing and storage nodes includes specific functions assumable only by other computing and storage nodes, such that a control node cannot assume the specific functions of the computer and storage nodes;
    an act of detecting a failure of at least one active node; and
    an act of instantiating a corresponding spare node that is configured to perform the functions of the failed active node.

2. The method of claim 1, wherein the control node cluster and the compute node cluster are located on the same computing appliance.

3. The method of claim 2, wherein each node of the computing appliance is linked via an internal network within the computing appliance.

4. The method of claim 3, wherein the internal network within the computing appliance comprises one or more redundant switches, each switch with its own redundant power supply.

5. The method of claim 2, wherein each component of the computing appliance has a corresponding redundant component, and wherein each component has a redundant power supply.

6. The method of claim 2, wherein the control node cluster is accessible via a control section, such that users log in to the control node to control the computing appliance.

7. The method of claim 2, wherein for at least one type of node, a computing appliance user determines a customizable number of spare nodes for that type of node.

8. The method of claim 2, wherein upon failure of the detected active node, connections between previously running services are automatically reestablished.

9. The method of claim 2, wherein the currently active control node determines which services are to be restarted and which are to be terminated.

10. The method of claim 9, wherein upon determining that a service has been terminated a specified number of times, the currently active control node determines that the node running that service is no longer working and that a spare node is to be initialized in its place.

11. The method of claim 9, wherein the currently active control node determines whether to perform a service restart or to perform a service restore.

12. The method of claim 11, wherein restoring the service includes persisting the current state of the service and requesting the nodes with which the service was communicating to resend their data.

13. The method of claim 2, wherein one or more policies are implemented at the computing appliance which define how failures are to be handled for each type of component on the computing appliance.

14. A computer system comprising the following:
    one or more processors;
    system memory;
    one or more computer-readable storage device having stored thereon computer-executable instructions that, when executed by the one or more processors, causes the computing system to perform a method for establishing a fault tolerant parallel database system, the method comprising the following:
        an act of establishing a control node cluster comprising at least one active control node and at least one spare control node, wherein each node of the control node cluster includes specific functions assumable only by other control nodes, such that a compute or storage node cannot assume the specific function of the control nodes;
        an act of establishing a compute node cluster separate from the control node cluster comprising at least one active computing node, at least one spare computing node, at least one active storage node and at least one spare storage node, wherein each of the computing and storage nodes includes specific functions assumable only by other computing and storage nodes, such that a control node cannot assume the specific functions of the compute and storage nodes;
        an act of detecting a failure of at least one active node; and
        an act of instantiating a corresponding spare node that is configured to perform the functions of the failed active node.

15. The system of claim 14, wherein a service policy indicates how many times a service is allowed to be restarted before it is terminated, and wherein the service policy indicates that when the embedded health detectors have received a specified number of termination signals, the service is to be moved to a spare node.

16. A computer program product for implementing a method for detecting the health of parallel database services, the computer program product comprising one or more computer-readable storage devices having stored thereon computer-executable instructions that, when executed by one or more processors of the computing system, cause the computing system to perform the method, the method comprising:
    an act of establishing a control node cluster comprising at least one active control node and at least one spare control node, wherein each node of the control node cluster includes specific functions assumable only by other control nodes, such that a compute or storage node cannot assume the specific function of the control nodes;
    an act of establishing a compute node cluster separate from the control node cluster comprising at least one active computing node, at least one spare computing node, at least one active storage node and at least one spare storage node, wherein each of the computing and storage nodes includes specific functions assumable only by other computing and storage nodes, such that a control node cannot assume the specific functions of the compute and storage nodes;

an act of detecting a failure of at least one active node; and an act of instantiating a corresponding spare node that is configured to perform the functions of the failed active node.

17. The computer program product of claim 16 further comprising computer executable instructions that when executed by one or more processors cause a currently active control node to determine which services are to be restarted and which are to be terminated.

18. The computer program product of claim 17, wherein upon determining that a service has been terminated a specified number of times, the computer program product further comprises computer executable instructions that when executed by one or more processors cause the currently active control node to determine that the node running that service is no longer working and that a spare node is to be initialized in its place.

19. The computer program product of claim 17, wherein the computer program product further comprises computer executable instructions that when executed by one or more processors cause the currently active control node to determine whether to perform a service restart or to perform a service restore.

20. The computer program product of claim 19, wherein restoring the service includes persisting the current state of the service and requesting the nodes with which the service was communicating to resend their data.

\* \* \* \* \*